United States Patent
Kamenoue

(10) Patent No.: US 9,083,168 B2
(45) Date of Patent: Jul. 14, 2015

(54) GROMMET

(75) Inventor: Masayoshi Kamenoue, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/452,404

(22) PCT Filed: Jul. 3, 2008

(86) PCT No.: PCT/JP2008/062075
§ 371 (c)(1),
(2), (4) Date: Dec. 29, 2009

(87) PCT Pub. No.: WO2009/005128
PCT Pub. Date: Jan. 8, 2009

(65) Prior Publication Data
US 2010/0115728 A1   May 13, 2010

(30) Foreign Application Priority Data
Jul. 4, 2007  (JP) .................. 2007-176552

(51) Int. Cl.
*F16L 5/00*  (2006.01)
*H02G 3/22*  (2006.01)
*B60R 16/02*  (2006.01)
*H01B 17/58*  (2006.01)

(52) U.S. Cl.
CPC .............. *H02G 3/22* (2013.01); *B60R 16/0222* (2013.01); *H01B 17/583* (2013.01); *Y10T 16/05* (2015.01)

(58) Field of Classification Search
CPC ............................. B60R 16/0222; H02G 3/22
USPC ...... 174/650, 152 G, 153 G, 157; 16/2.1, 2.2, 16/2.3, 2.5; 403/194, 195, 238
See application file for complete search history.

(56) References Cited

U.S. PATENT DOCUMENTS

| | | | | | |
|---|---|---|---|---|---|
| 737,407 | A | * | 8/1903 | Hirsch | 242/613 |
| 2,265,179 | A | * | 12/1941 | MacDonald | 285/154.3 |
| 3,910,608 | A | * | 10/1975 | Phillips, Jr. | 285/154.4 |
| 4,192,477 | A | * | 3/1980 | Decky et al. | 248/56 |
| 5,499,823 | A | * | 3/1996 | Fukui | 277/314 |

(Continued)

FOREIGN PATENT DOCUMENTS

| | | |
|---|---|---|
| JP | 07-163034 | 6/1995 |
| JP | 09-092063 | 4/1997 |

(Continued)

OTHER PUBLICATIONS

International Search Report and Written Opinion dated Oct. 7, 2008 issued in International Application No. PCT/JP2008/062075.

*Primary Examiner* — Victor Batson
*Assistant Examiner* — Matthew Sullivan
(74) *Attorney, Agent, or Firm* — Locke Lord LLP

(57) ABSTRACT

A grommet 1, which is configured to be attached to a hole 10*a* in a panel 10, includes a cylindrical body 2 having along its entire periphery a locking recess 3 that is locked into the hole 10*a*. Also, on an outer surface of the body 2, there is provided two first ribs 8 spaced from each other and extending from one end of the body 2 to the other end of the body 2, and two second ribs 7. These first ribs 8 are provided on one side with reference to a virtual plane that includes a central axis P and an alternate long and two short dashes line Q. The second ribs 7 are provided on the other side with reference to the virtual plane. Also, a width of the first rib 8 is larger than that of the second rib 7.

13 Claims, 5 Drawing Sheets

(56) References Cited

U.S. PATENT DOCUMENTS

| | | | |
|---|---|---|---|
| 5,526,549 A * | 6/1996 | Mori et al. | 16/2.1 |
| 5,856,635 A * | 1/1999 | Fujisawa et al. | 174/153 G |
| 6,240,597 B1 * | 6/2001 | Mochizuki | 16/2.1 |
| 6,525,269 B2 * | 2/2003 | Sato | 174/660 |
| RE38,788 E * | 9/2005 | Satou et al. | 16/2.1 |
| 7,434,814 B2 * | 10/2008 | Kumakura et al. | 277/606 |
| 2001/0044984 A1 * | 11/2001 | Ono et al. | 16/2.5 |
| 2004/0154819 A1 * | 8/2004 | Sakata | 174/65 G |
| 2009/0235484 A1 * | 9/2009 | Bringhenti | 16/2.2 |
| 2010/0000764 A1 * | 1/2010 | Suzuki | 174/152 G |

FOREIGN PATENT DOCUMENTS

| | | |
|---|---|---|
| JP | 2001-145237 | 5/2001 |
| JP | 2008092644 A * | 4/2008 |

* cited by examiner

GROMMET

TECHNICAL FIELD

The present invention relates to a grommet configured to be mounted on a panel of a body of a vehicle such as an automobile with a wiring harness passed therethrough.

BACKGROUND ART

Use of a grommet 101 shown in FIG. 9 (for example, see Patent Literature 1) is common when a wiring harness is passed through a hole in a panel of a body of a vehicle, which may be an automobile, in a case where a liquid such as water should be prevented from coming into contact with the wiring harness.

The grommet 101 of FIG. 9 may be made of a rubber and include in one piece therewith a cylindrical portion 105; a body 102 continuous to the cylindrical portion 105, with an inner diameter and an outer diameter thereof gradually increased from one end thereof to an other end thereof; a second cylindrical portion 106 continuing to the other end of the body 102; a locking recess 103 provided along an entire periphery of the body 102 and configured to be locked into the hole in the panel; and a lip 104 operable to adhere to the panel.

When mounting the grommet 101 into the hole in the panel, an operator may insert the grommet 101 from the side of the cylindrical portion 105 into the hole in the panel along its central axis P; press a proximal portion of the body 102 (which is defined to be proximal with reference to the central axis P) toward the distal side (which is defined to be distal with reference to the central axis P); grasp the cylindrical portion 105 and/or the second cylindrical portion 106 to pull the body 102 to the proximal side; alternately and repeatedly apply upon the proximal portion (a) a pressing force acting from the proximal side to the distal side and (b) a pressing force acting from the distal side to the proximal side; thereby cause the body 102 to elastically deform in a diameter-contracting direction (here, "diameter-contracting" refers to decreasing of the inner and outer diameters); and locks the locking recess 103 in the hole, so that the grommet 101 is attached to the panel.

[Patent Literature] Japanese Patent Application Laid-Open Publication No. H07-163034

SUMMARY OF THE INVENTION

Technical Problem

In the conventional grommet 101, since the cylindrical portion 105 may be bent after having been attached to the panel, thicknesses of the cylindrical portion 105 and the body 102 are made small for the sake of bendability of the cylindrical portion 105. On account of this configuration, in the conventional grommet 101, when elastically deforming the body 102 in the diameter-contracting direction, the pressing force is difficult to be transferred to the grommet 101, causing difficulty in attaching the grommet 101 to the panel.

Accordingly, an object of the present invention is o provide a grommet that can more readily be attached to the panel.

Solution to Problem

In order to attain the above objective, there is provided a grommet according to a first aspect of the present invention that includes: a body configured to be attached to a hole in a panel, a locking portion provided on an outer periphery of one end of the body; and a cylindrical portion continuing to an other end of the body. A bending strength of one side of the body with reference to a virtual plane including a central axis of the body axis is larger than a bending strength of the other side of the body;

According to a second aspect of the present invention, in the invention according to the first aspect of the present invention, the one side of the body includes at least one rib extending from the one end of the body to the other end of the body.

According to a third aspect of the present invention, in the invention according to the second aspect of the present invention, the other side of the body includes at least one second rib extending from the one end of the body to the other end of the body. The number of one or more of the ribs is larger than that the number of one or more of the second ribs.

According to a fourth aspect of the present invention, in the invention according to either of the second or third aspects of the present invention, the other side of the body includes at least one second rib extending from the one end of the body to the other end of the body. Either a thickness or a width of the rib is larger than either a thickness or a width of the second rib.

According to a fifth aspect of the present invention, in the invention according to any of the second to fourth aspect of the present invention, a plurality of the ribs or the second ribs are spaced from each other.

According to a sixth aspect of the present invention, in the invention according to the first aspect of the present invention, the one side of the body includes a thick portion whose thickness is larger than a thickness of the other side of the body.

According to a seventh aspect of the present invention, in the invention according to any of the first to sixth aspects of the present invention, the locking portion is inserted and locked into the hole in the panel from the side of the body to which the cylindrical portion continues. The one side of the body is acted upon alternately by a pressing force acting from the one side to the other side of the body and a pressing force acting from the other side to the one side of the body.

Advantageous Effects of the Invention

According to the first aspect of the present invention, since the bending strength of the one side with reference to the virtual plane including the central axis of the body is larger than the bending strength of the other side, when pressing the locking portion of the grommet into the hole of the panel, it is made easier for the pressing force acting from the one side to the other side and the pressing force acting from the other side to the one side to be transferred to the one side of the body, thereby the grommet can more readily be attached to the panel of the grommet.

According to the second aspect of the present invention, since the at least one rib extending from on end of the body to the other end of the body is provided on the one side of the body, the bending strength of the one side of the body becomes larger than that of the other side of the body. As a result, the grommet can more readily be attached to the panel.

According to the third aspect of the present invention, since the at lease one second rib extending form the one end of the body to the other end of the body is provided on the other side of the body and the number of the ribs is larger than that of the second ribs, the bending strength of the one side of the body becomes larger than that of the other side. As a result, the grommet can be more readily attached to the panel.

According to the fourth aspect of the present invention, since the at least one second rib extending from the one end of the body to the other end of the body, and at least either the width or the thickness of the rib is larger than those of the second rib, the bending strength of the one side of the body becomes larger than that of the other side. As a result, the grommet can be more readily attached to the panel.

According to the fifth aspect of the present invention, since a plurality of the ribs or the second ribs are spaced from each other, a section of the body between the ribs or the second ribs can be bent more easily, which further allows the wiring harness to be more easily bent, and as a result, more flexible arrangement of wiring harnesses can be achieved.

According to the sixth aspect of the present invention, since the thick portion, whose thickness is enlarged relative to the other side, is provided on the one side of the body, the bending strength of the one side becomes larger than that of the other side. As a result, the grommet can more readily be attached to the panel.

According to the seventh aspect of the present invention, the grommet is inserted from the side of the cylindrical portion into the hole in the panel, while the pressing force acting from the one side to the other side and the pressing force acting from the other side to the one side are alternately applied to the one side of the body so that the locking portion is deformed and locked into the hole, the grommet can more readily be attached to the panel.

DESCRIPTION OF EMBODIMENTS

The following describes a grommet according to a first embodiment of the present invention with reference to FIGS. 1 to 6. The grommet 1 according to the first embodiment of the present invention is configured to be attached to a hole 10a (shown in FIGS. 4 and 5) provided in a dash panel 10 (hereafter simply called "panel") that serves as a partition between an interior and an engine room of an automobile 11 (shown in FIG. 5). Also, in the first embodiment, the hole 10a has a round planar shape.

Figure 1:
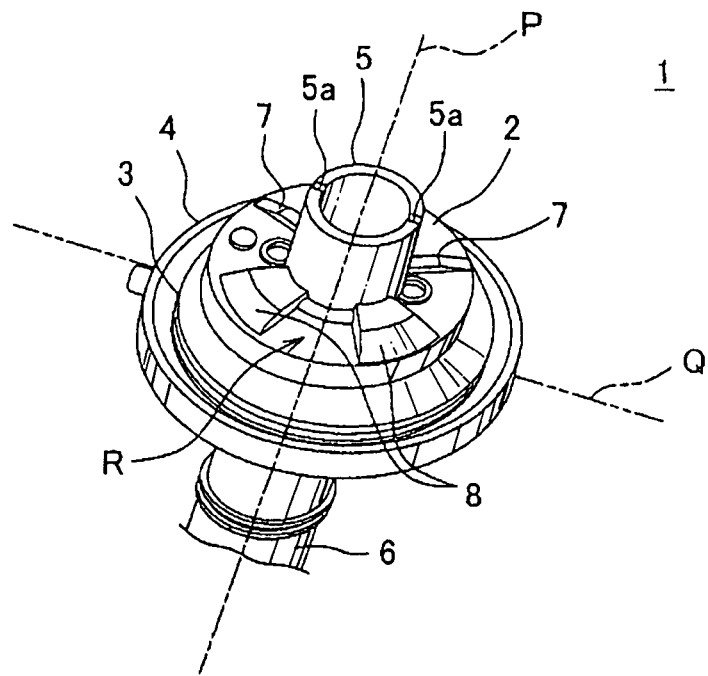
FIG. 1 is a perspective view illustrating a grommet according to a first embodiment of the present invention.
Figure 4:
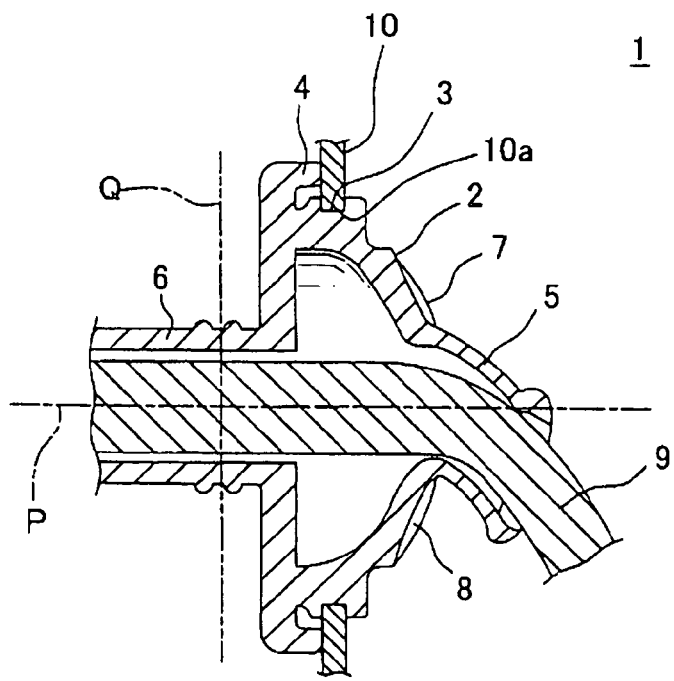
FIG. 4 is a cross-sectional view illustrating the grommet of FIG. 1 that has been attached to the panel.

The grommet 1 may be made of an elastically deformable rubber and have a cylindrical shape, through which a wiring harness 9 (shown in FIGS. 3 and 4) are passed so as to be attached to the automobile 11. The grommet 1 maintains watertightness between the grommet 1 and the panel 10 so that a liquid such as water is prevented from penetrating an inside through a gap between the grommet 1 and the panel 10, and from coming into contact with the wiring harness 9. The grommet 1 has in one piece therewith, as shown in FIGS. 1 and 4, a pair of cylindrical portions 5, 6 and a body 2.

The cylindrical portions 5, 6 have a cylindrical shape through which the wiring harness 9 is passed. An outer diameter of the cylindrical portions 5, 6 is smaller than an inner diameter of the hole 10a. The pair of cylindrical portions 5, 6 continue to one end and an other end of the body 2 with reference to the central axis P (indicated by an alternate long and short dash line in FIG. 1), respectively. Also, the cylindrical portion 5 has two slits 5a that are notched at a peripheral portion of the cylindrical portion 5, the peripheral portion being on the far side of the body 2, and the notch extending from a center side to an outer side of the cylindrical portion 5 with reference to the central axis P.

The body 2 has a cylindrical shape whose inner diameter and outer diameter gradually decreases from one end continuing to the cylindrical portion 6 to the other end continuing to the cylindrical portion 5. Also, the body 2 is arranged coaxially with respect to the pair of cylindrical portions 5, 6, and thus connected in series to the pair of cylindrical portions 5, 6.

The body 2 lets the wiring harness 9 pass therethrough via the pair of cylindrical portion 5, 6. The outer diameter of the one end of the body 2 is larger than the inner diameter of the hole 10a, and the outer diameter of the other end of the body 2 is smaller than the inner diameter of the hole 10a.

A locking recess 3 as a locking portion is provided on the other end of the body 2 along its entire periphery. As shown in FIG. 4, the locking recess 3 is recessed relative to an outer surface of the body 2. The locking recess 3 is locked into the hole 10a in such a manner that a bottom surface of the grommet 1 is brought into contact with an inner surface of the hole 10a, by inserting the grommet 1 from the side of its cylindrical portion 5 along the central axis P into the hole 10a of the panel 10, and bending the grommet 1 inward along a radial direction (indicated by an alternate long and two short dashes line Q in FIG. 1) and then elastically restoring the grommet 1.

Also, a lip 4 which is raised toward the cylindrical portion 5 is provided along the entire periphery of the body 2 such that the lip 4 is closer to the cylindrical portion 6 than the locking recess 3 is. When the grommet 1 is attached to the panel 10 as shown in FIG. 4, the lip 4 is brought into contact with a surface of the panel 10 to provide watertightness between the grommet 1 and the panel 10.

Figure 2:
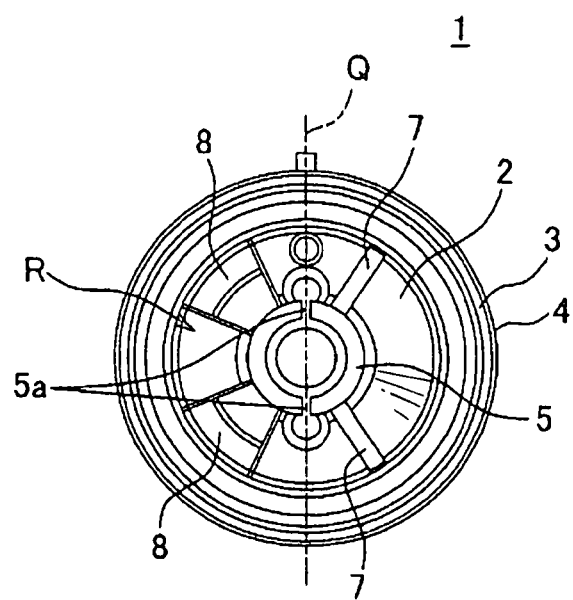
FIG. 2 is a plan view of the grommet of FIG. 1.
Figure 3:
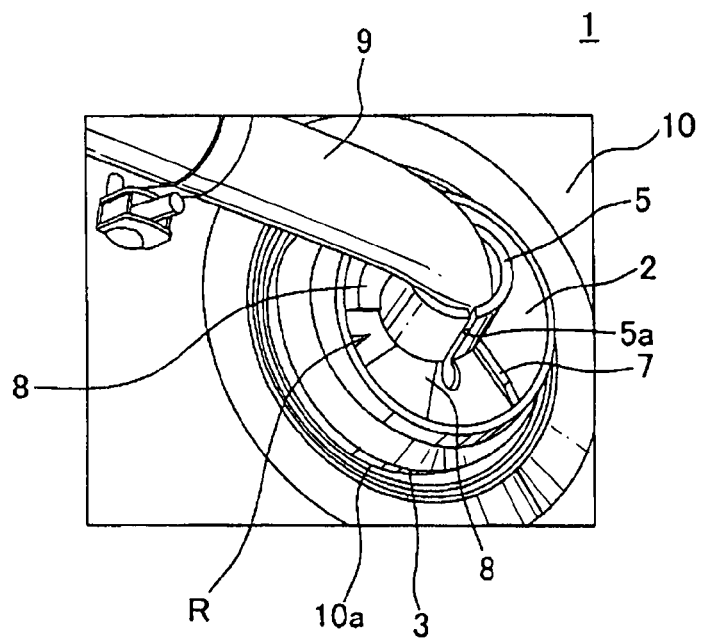
FIG. 3 is a perspective view illustrating the grommet of FIG. 1 that has been attached to the panel.

Further, as shown in FIGS. 1 and 2, on the outer surface of the body 2, there are provided two first ribs 8 (which is the "rib" claimed in the following appended claims) and two second ribs 7, each extending from the one end of the body 2 (i.e., from the side of the cylindrical portion 6) to the other end thereof (i.e., to the side of the cylindrical portion 5).

These first ribs 8 are provided on one side with reference to the virtual plane that includes both the central axis P and the alternate long and two short dashes line Q (i.e., a left side relative to the alternate long and two short dashes line Q in FIG. 2). Also, the second rib 7 is provided on the other side with reference to the virtual plane (i.e., on a right side relative to the alternate long and two short dashes line Q in FIG. 2). Also, the alternate long and two short dashes line Q is a virtual straight line orthogonal to the central axis P of the body 2.

These ribs 7, 8 are spaced from each other. Also, these ribs 7, 8 have the same degree of protrusion (i.e., thickness) from the outer surface of the body 2. Also, a width of the first rib 8 (which means the width along the circumference of the body 2) is larger than that of the second rib 7.

In the body 2 with this construction, a bending strength of the one side relative to the virtual plane is larger than that of the other side relative to the virtual plane. Also, a portion where the ribs 7, 8 of the body 2 are not provided has a thickness such that the bending strength is the minimum that is required for functioning as a grommet. Also, the grommet 1 is attached to the panel 10 with the wiring harness 9 passed through the grommet 1, and, immediately after that, the cylindrical portion 5 is bent. The first rib 8 is provided such that the direction of this bending extends in a section R between the two first ribs 8, the bending strength of the section R being smaller than that of sections where the first ribs 8 are provided. This configuration makes it possible to more readily bend the wiring harness 9 and the cylindrical portion 5, allowing more flexible arrangement of the wiring harness 9.

Figure 5:
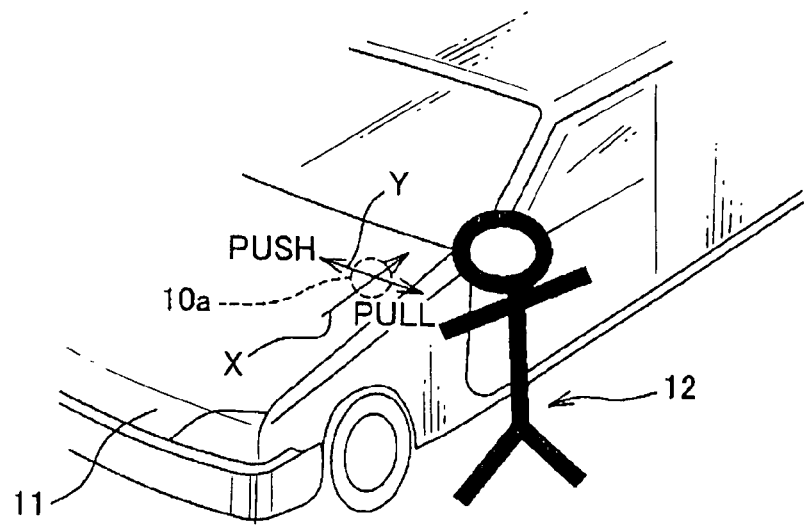
FIG. 5 is an explanatory view illustrating an automobile to which the grommet of FIG. 1 is to be attached with a position of operation by an operator indicated.
Figure 6:
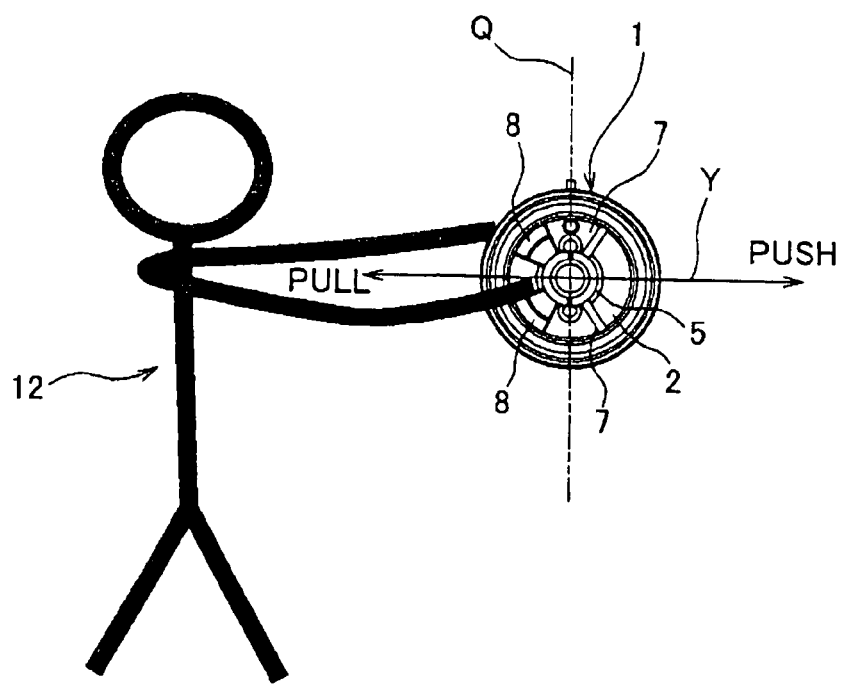
FIG. 6 is an explanatory view illustrating the orientations of the operator and the grommet as the operator attaches the grommet to the automobile.

When attaching the grommet 1 with the construction to the panel 10, as shown in FIG. 5, an operator 12 stand at a side of the automobile 11, and as shown in FIG. 6, grasps the one end and the other end of the body 2. At this point, the operator 12 faces the section R between the two first ribs 8. Also, although the wiring harness 9 is not shown in FIG. 6, the wiring harness 9 is in practice passed through the grommet 1 and then the grommet 1 is attached to the panel 10. Also, the cylindrical portion 5 and the hole 10a of the panel 10 are opposed to each other along the central axis P, and the grommet 1 is gradually inserted into the hole 10a along an arrow X which is parallel to the central axis P. Also, the arrow X extends from a front to a rear of the automobile 11.

When the grommet 1 is inserted into the hole 10a along the arrow X until the outer surface of the body 2 is brought into contact with the inner periphery of the hole 10a, the one side where the first ribs 8 are provided is subjected to a pressing force acting along the arrow Y from one side to the other side where the second ribs 7 are provided. The arrow Y is a direction orthogonal to the arrow X and face to face with the operator 12. This means that the one side is subjected to the pressing force in the direction away from the operator 12. Through this, the body 2 is elastically deformed along the arrow Y in the direction of diameter-contraction (which means decrease of the inner and outer diameters), so that the one side of the locking recess 3 is locked into the hole 10a.

Subsequently, the grommet 1 is pulled from the other side to the one side for example by grasping of the cylindrical portion 5 and the cylindrical portion 6. This means that the other side is pulled toward the operator 12 himself or herself. Thus, the body 2 is elastically deformed along the arrow Y in the direction of diameter contraction, so that the other side of the locking recess 3 is locked into the hole 10a.

In the present invention, the bending strength of the one side is larger than that of the other side, so that, when the grommet 1 is elastically deformed in the direction of diameter contraction, pressing force that has been exerted upon the grommet 1 by the operator 12 from its one side is more easily transferred, so that, even when the working posture of the operator 12 is difficult to apply the force, the locking recess 3 can easily be locked into the hole 10a. Also, when the grommet 1 is pulled from the other side to the one side, the operator 12 is in a working posture by which he/she can readily apply his or her force so that, the grommet 1 can easily be attached even when the bending strength of the other side is not so large as that of the one end.

In this manner, through the locking recess 3 configured to be locked into the hole 10a, the grommet 1 is secured to the panel 10. Also, in this state, the lip 4 is brought into contact with the surface of the panel 10 so that the watertightness is established between the grommet 1 and the panel 10. Further, the wiring harness 9 and the cylindrical portion 5 that have drawn into the interior of the automobile are bent on the section R between the two first ribs 8 so as to be connected to the interior of the automobile.

Figure 7:
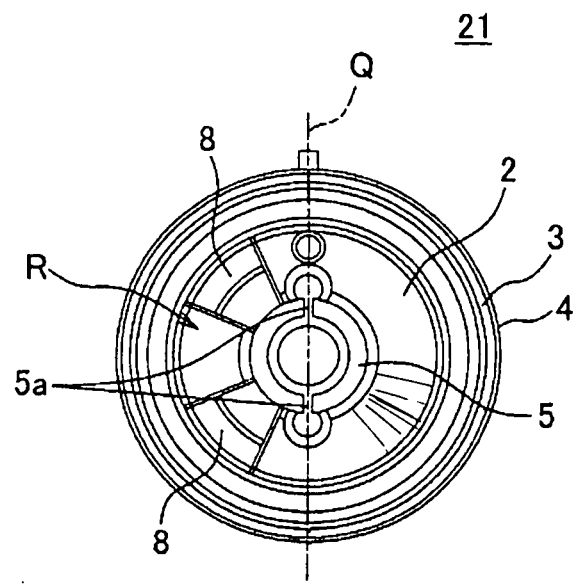
FIG. 7 is a plan view illustrating a grommet according to a second embodiment of the present invention.

The following describes the grommet according to a second embodiment of the present invention with reference to FIG. 7. In FIG. 7, the same reference numbers are assigned to the same elements as in the first embodiment and explanations thereof are omitted.

The grommet 21 of the second embodiment is, as shown in FIG. 7, has the two first ribs 8 spaced from each other on the one side thereof. On the other side, there is no second rib 7.

In the present invention, in this manner, it is not prerequisite that the other side include a rib. It will be sufficient as long as at least one side includes the rib.

Figure 8:
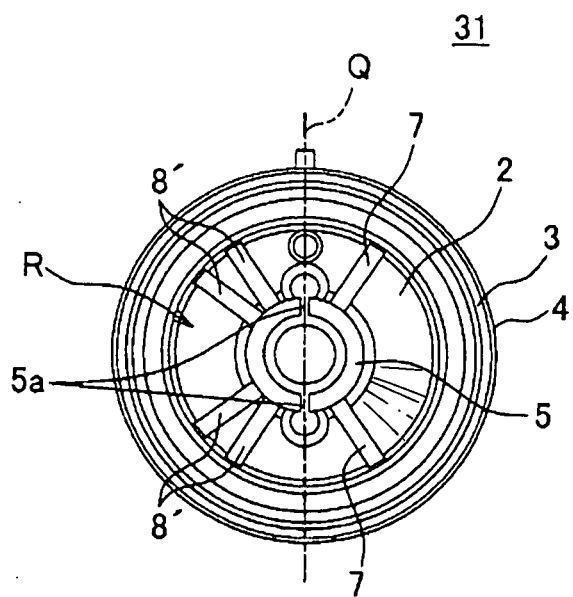
FIG. 8 is a plan view illustrating a grommet according to a third embodiment of the present invention.
Figure 9:
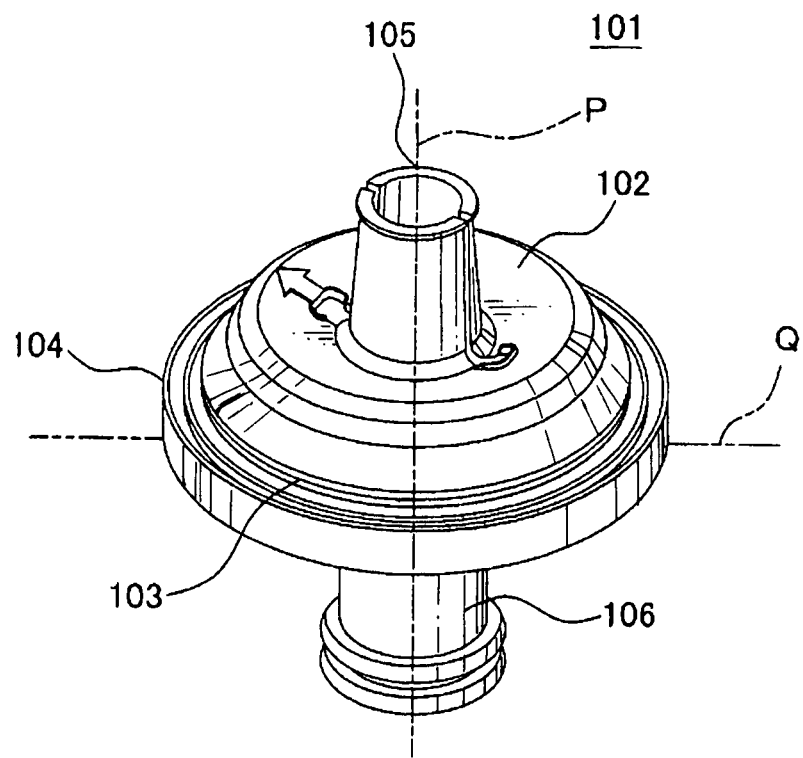
FIG. 9 is a perspective view illustrating a conventional grommet.

The following describes the grommet according to a third embodiment of the present invention with reference to FIG. 8. In FIG. 8, the same reference signs are assigned to the same elements as in the first and second embodiments, and explanations thereof are omitted.

The grommet 31 of the third embodiment has, as shown in FIG. 8, four first ribs 8' spaced from each other on the one side. On the other side, there is provided two second ribs 7 spaced from each other. Also, a thickness and a width of the first rib 8' is identical with those of the second rib 7.

In the present invention, in this manner, the number of the first rib 8' may be larger than that of the second rib 7, so that the bending strength of the one side becomes larger than that of the other side.

The following describes the grommet according to a fourth embodiment of the present invention. In the grommet (not shown) of the fourth embodiment, the one side has a thick portion whose thickness is increased relative to the other side. Also, the term "thick portion" in the context of the present invention refers to a portion of the one side whose thickness is larger than that of the other side when compared with reference to the central axis P with these two portions being symmetrical with respect to the central axis P.

In the present invention, in this manner, the bending strength of the one side may be made larger than that of the other side not by providing the ribs but by different thicknesses of the grommet.

Also, in the first and third embodiments, the thickness of the first ribs 8, 8' are made equal to that of the second rib 7. Nevertheless, in the present invention, these can have different thicknesses from each other so that the bending strength of the one side is increased relative to that of the other side.

It should be noted that the embodiments that have been described are typical forms of embodiments of the present invention, and therefore the present invention is not confined to the above-described embodiments. That is, the present invention can be reduced to practice with various modifications insofar as the scope and spirit of the present invention are not deviated from.

REFERENCE SIGNS LIST 1, 21, 31 Grommet
2 Body
3 Locking portion
5 Cylindrical portion
7 Second rib
8 First rib (Rib)
9 Wiring harness
10 Panel
10a Hole
P Central axis

The invention claimed is:

1. A grommet through which a wiring harness is passed, comprising:
   an elastically deformable disk-shaped body configured to be attached to a hole in a panel,
   a pair of elastically deformable cylindrical portions extending away from each of two opposing outer surfaces of the disk-shaped body in opposite directions therefrom along an axis running through the opposing outer surfaces and a center of the body,
   wherein
   one side of one outer surface of the body includes at least one rib extending radially outward on the outer surface of the body from the center of the body, and the center axis of the body and the center axis of the cylindrical portions are the same such that a bending strength of the one side of the body with reference to a virtual plane including the axis is larger than a bending strength of an other side of the body; and
   an elastically deformable locking portion provided on an outer periphery of the disk-shaped body,
   the other side of the outer surface of the disk-shaped body includes at least one second rib extending radially outward on the outer surface of the body, either a thickness or a width of the rib being larger than either a thickness or a width of the second rib, the width of the rib being larger as extending in a radial direction from an outer periphery of the cylindrical portion, and
   the ribs extending in a radial direction from an outer periphery of the cylindrical portions.

2. The grommet according to claim 1, wherein the other side of the outer surface of the disk-shaped body includes at least one second rib extending radially outward on the outer surface of the body, the number of one or more of the at least one rib being larger than that the number of one or more of the second ribs.

3. The grommet according to claim 2, wherein a plurality of the at least one rib or the second ribs are spaced from each other.

4. The grommet according to claim 1, wherein the one side of the outer surface of the disk-shaped body includes a thick portion whose thickness is larger than a thickness of the other side of the body.

5. The grommet according to claim 1, wherein the locking portion is inserted and locked into the hole in the panel from the side of the body to which the cylindrical portion continues, the one side of the body being acted upon alternately by a pressing force acting from the one side to the other side of the body and a pressing force acting from the other side to the one side of the body.

6. The grommet according to claim 2, wherein the other side of the outer surface of the disk-shaped body includes at least one second rib, either a thickness or a width of the rib being larger than either a thickness or a width of the second rib.

7. The grommet according to claim 2, wherein a plurality of the ribs or the second ribs are spaced from each other.

8. The grommet according to claim 1, wherein a plurality of the ribs or the second ribs are spaced from each other.

9. The grommet according to claim 2, wherein the locking portion is inserted and locked into the hole in the panel from the side of the body to which the cylindrical portion continues, the one side of the body being acted upon alternately by a pressing force acting from the one side to the other side of the body and a pressing force acting from the other side to the one side of the body.

10. The grommet according to claim 1, wherein the locking portion is inserted and locked into the hole in the panel from the side of the body to which the cylindrical portion continues, the one side of the body being acted upon alternately by a pressing force acting from the one side to the other side of the body and a pressing force acting from the other side to the one side of the body.

11. The grommet according to claim 3, wherein the locking portion is inserted and locked into the hole in the panel from the side of the body to which the cylindrical portion continues, the one side of the body being acted upon alternately by a pressing force acting from the one side to the other side of the body and a pressing force acting from the other side to the one side of the body.

12. The grommet according to claim 4, wherein the locking portion is inserted and locked into the hole in the panel from the side of the body to which the cylindrical portion continues, the one side of the body being acted upon alternately by a pressing force acting from the one side to the other side of the body and a pressing force acting from the other side to the one side of the body.

13. A grommet through which a wiring harness is passed, comprising:
   an elastically deformable disk-shaped body configured to be attached to a hole in a panel,
   a pair of elastically deformable cylindrical portions extending away from each of two opposing outer surfaces of the disk-shaped body in opposite directions therefrom along an axis running through the opposing outer surfaces and a center of the body,
   wherein one side of one outer surface of the body includes a thick portion whose thickness is larger than a thickness of an other side of the body such that a bending strength of the one side of the body with reference to a virtual plane including the central axis of the body and including both opposing outer surfaces of the body is larger than a bending strength of the other side of the body; and,
   an elastically deformable locking portion provided on an outer periphery of the disk-shaped the body.

* * * * *